(12) United States Patent
Viavattine et al.

(10) Patent No.: US 7,556,298 B2
(45) Date of Patent: Jul. 7, 2009

(54) APPARATUS AND METHOD FOR POSITIONING CURRENT COLLECTORS IN AN ELECTROCHEMICAL CELL

(75) Inventors: Joseph J. Viavattine, Vadnais Heights, MN (US); Paul B. Aamodt, Richfield, MN (US)

(73) Assignee: Medtronic, Inc., Minneapolis, MN (US)

( * ) Notice: Subject to any disclaimer, the term of this patent is extended or adjusted under 35 U.S.C. 154(b) by 413 days.

(21) Appl. No.: 11/393,274

(22) Filed: Mar. 30, 2006

(65) Prior Publication Data

US 2007/0228751 A1 Oct. 4, 2007

(51) Int. Cl.
*B25J 15/06* (2006.01)
(52) U.S. Cl. ...................... 294/64.1; 294/902
(58) Field of Classification Search ........... 294/64.1, 294/65, 902; 901/40; 414/627, 737, 752.1; 29/743
See application file for complete search history.

(56) References Cited

U.S. PATENT DOCUMENTS

| | | | | |
|---|---|---|---|---|
| 4,185,814 A | * | 1/1980 | Buchmann et al. | ......... 271/108 |
| 4,631,815 A | * | 12/1986 | Bocchicchio et al. | ......... 29/739 |
| 4,703,965 A | | 11/1987 | Lee et al. | |
| 4,787,662 A | * | 11/1988 | Dewez | ...................... 294/64.1 |
| 4,799,722 A | * | 1/1989 | Marzinotto | ................ 294/64.1 |
| 4,883,300 A | * | 11/1989 | Akagawa | ....................... 294/2 |
| 5,179,773 A | | 1/1993 | Monsees et al. | |
| 5,314,223 A | | 5/1994 | Harper, Jr. et al. | |
| 5,420,488 A | | 5/1995 | Gutman | |
| 5,588,203 A | * | 12/1996 | Bidefeld | ...................... 29/743 |
| 5,611,585 A | * | 3/1997 | Lingen | ...................... 294/64.1 |
| 5,634,764 A | | 6/1997 | Replogle | |
| 6,321,114 B1 | | 11/2001 | Nutzman et al. | |
| 6,341,808 B1 | * | 1/2002 | Baan et al. | ................. 294/64.1 |
| 6,371,776 B1 | | 4/2002 | Li et al. | |
| 6,678,559 B1 | | 1/2004 | Breyen et al. | |
| 6,721,602 B2 | | 4/2004 | Engmark et al. | |
| 6,829,135 B2 | | 12/2004 | Honda et al. | |
| 6,885,548 B2 | | 4/2005 | Nyberg | |
| 6,885,887 B2 | | 4/2005 | O'Phelan et al. | |
| 2002/0007552 A1 | | 1/2002 | Singleton et al. | |
| 2003/0199941 A1 | | 10/2003 | Nielsen et al. | |
| 2003/0199942 A1 | | 10/2003 | Nielsen et al. | |
| 2004/0046545 A1 | | 3/2004 | Akiyama et al. | |

FOREIGN PATENT DOCUMENTS

WO WO99010942 A 3/1999

* cited by examiner

*Primary Examiner*—Dean J Kramer

(57) ABSTRACT

A vacuum actuated pick-up tool for transporting a current collector is provided. The pick-up tool comprises a housing having an external surface, an interior compartment, and a plurality of openings extending from the external surface to the interior compartment. The interior compartment is configured to be coupled in fluid communication with a vacuum source to pneumatically secure the current collector to the external surface. The pick-up tool further comprises at least one protrusion extending from the external surface for contacting and spatially orienting the collector when pneumatically secured to the external surface.

13 Claims, 5 Drawing Sheets

APPARATUS AND METHOD FOR POSITIONING CURRENT COLLECTORS IN AN ELECTROCHEMICAL CELL

TECHNICAL FIELD

This invention relates generally to a pick and place apparatus and, more particularly, to a vacuum actuated tool configured to transport and place current collectors of an electrochemical cell in contact with the cell's active material and compress the active material.

BACKGROUND OF THE INVENTION

Electrochemical cells are commonly employed in a variety of applications, such as implantable medical devices (e.g., cardiac pacemakers, cochlear implants, neurostimulators, active drug pumps, etc.). Known electrochemical cells employ a current collector in combination with a body of active material. The current collector may take the form of a flattened metal plate (e.g., titanium doped nickel) having an anode or cathode lead integrally coupled thereto. If the electrochemical cell containing the current collector is to be employed in an implantable medical device, it is desirable that the collector occupy a relative small volume to help maximize the cell's power-density. To this end, the current collector may be provided with a plurality (e.g., a grid) of apertures therethrough defining, for example, a lattice of crisscrossed or interwoven portions or veins. This grid of apertures may also promote cohesion between layers of certain active materials, such as silver vanadium oxide (SVO) powder.

Production of electrochemical cells of the type described above may begin with the introduction of an active material into the casting chamber of a press die. The active material may be, for example, an anode-type metal (e.g., lithium) or a cathode-type mix (e.g., SVO powder). Next, a collector chosen from a supply of collectors is inserted into the press die and subsequently pressed onto the active material. During pressing, the active material is compressed and adheres to the bottom side of the collector. After pressing, another layer of active material is introduced into the die and placed under pressure by a flat press to adhere the material to the top side of the collector. Lastly, the collector and active material are removed from the press die and inserted into a casing to complete construction of the electrochemical cell.

As with any process, the above-described cell construction process has certain limitations, many of which relate to the pressing of a current collector onto the active material. Current pressing methods involve manual insertion of a current collector into the press die and subsequent manual pressing. This has occasionally led to the misalignment of a collector relative to the active material and/or an uneven application of pressure over the surface of the collector, possibly causing deformation (e.g., bending, twisting, etc.) of the collector. In addition, the active material is known to extrude through the collector's apertures during the pressing process. This typically results in a reduction in thickness of the active material on the underside of the collector and, consequently, an undesirable asymmetry between active material layer thicknesses. Other difficulties with current cell construction processes are encountered outside of the pressing procedure. For example, collectors are occasionally found in a warped (e.g., a slightly concave, convex, or twisted) condition. As current cell construction processes do not effectively correct for misshapen collectors, the collector may be pressed onto the active material in its warped condition. Again, this may result in a misalignment between the collector and active material layers, especially if the active material is a powdered cathode mix (e.g., SVO powder) capable of sifting through the collector's apertures.

Considering the above, it should be appreciated that it would be desirable to provide method and apparatus for picking, placing, and pressing current collectors that overcomes the disadvantages described above (e.g., alignment errors) and that corrects for misshapen collectors. Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The following drawings are illustrative of particular embodiments of the invention and therefore do not limit the scope of the invention, but are presented to assist in providing a proper understanding. The drawings are not to scale (unless so stated) and are intended for use in conjunction with the explanations in the following detailed descriptions. The present invention will hereinafter be described in conjunction with the appended drawings, wherein like reference numerals denote like elements, and.

DETAILED DESCRIPTION OF THE EXEMPLARY EMBODIMENT

The following description is exemplary in nature and is not intended to limit the scope, applicability, or configuration of the invention in any way. Rather, the following description provides a convenient illustration for implementing an exemplary embodiment of the invention. Various changes to the described embodiment may be made in the function and arrangement of the elements described herein without departing from the scope of the invention.

Figure 1:
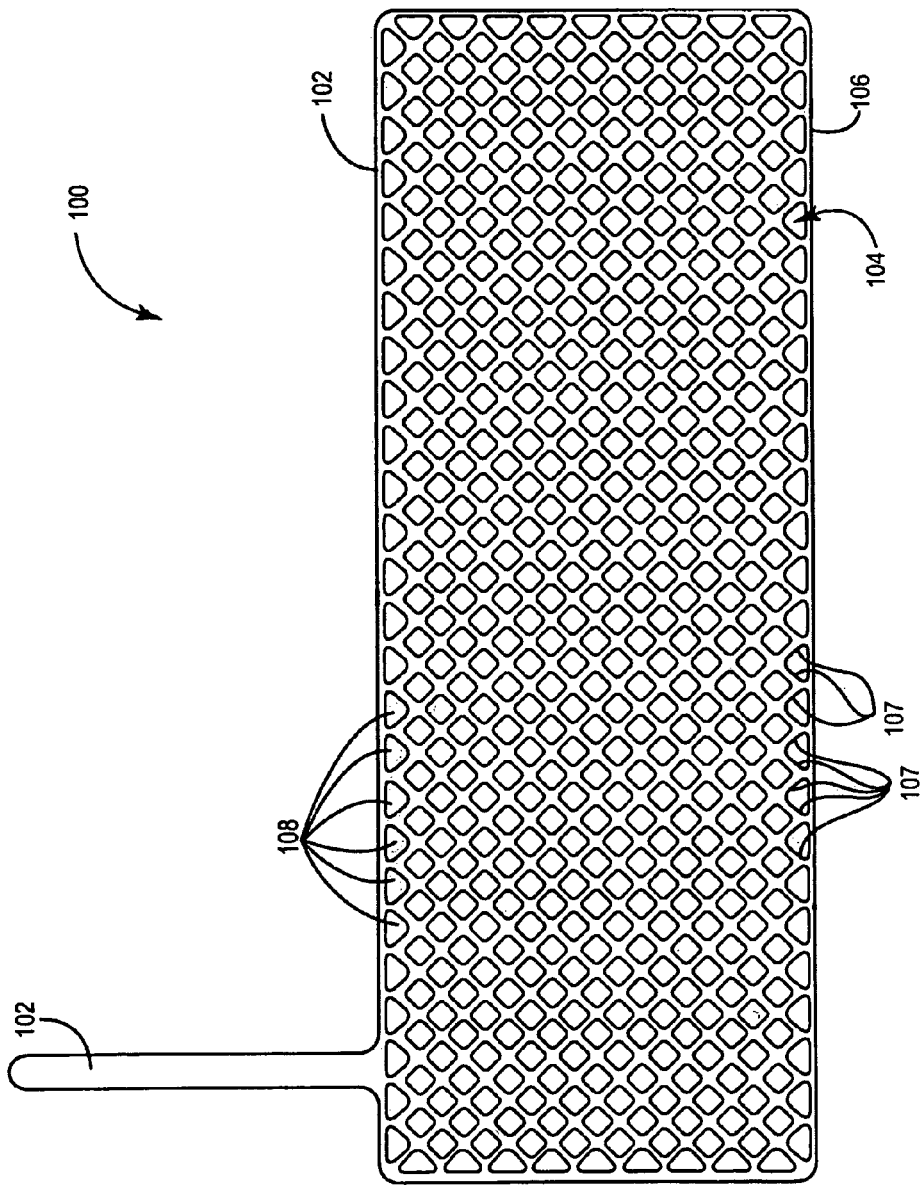
FIG. 1 is a front view of a known cathode collector.

FIG. 1 is a front view of a known cathode collector 100 having a cathode lead 102 integrally coupled thereto. Collector 100 comprises a flattened plate including a peripheral rim 102, a front facial surface 104, and a rear facial surface (not shown). A plurality of apertures 108 is provided through collector 100. In particular, apertures 108 extend from front facial surface 104 to the rear facial surface and cooperate to define, for example, a lattice of crisscrossing or interweaving portions (e.g., veins) 107. Apertures 108 function to decrease the volume of collector 100 and consequently increase the power-density of an electrochemical cell in which collector 100 is employed. Additionally, apertures 108 may function to promote cohesion between layers of active material (e.g., a cathode mix, such as SVO powder) disposed on either side of collector 100. Current collector 100 is preferably machined from an inert, electrically conductive material (e.g., titanium doped nickel) that allows electrons to flow from lead 102 to the active material when the electrochemical cell is charging and from the active material to lead 102 when the cell is discharging. The dimensions of collector 100 may be varied to suit a particular application. If employed in an implantable medical device (e.g., a cardiac pacemaker, a cochlear implant, a neurostimulator, an active drug pump, etc.), collector 100 may have, for example, a width of approximately 0.6 inch and a length of approximately 1.5 inches.

Figure 2:
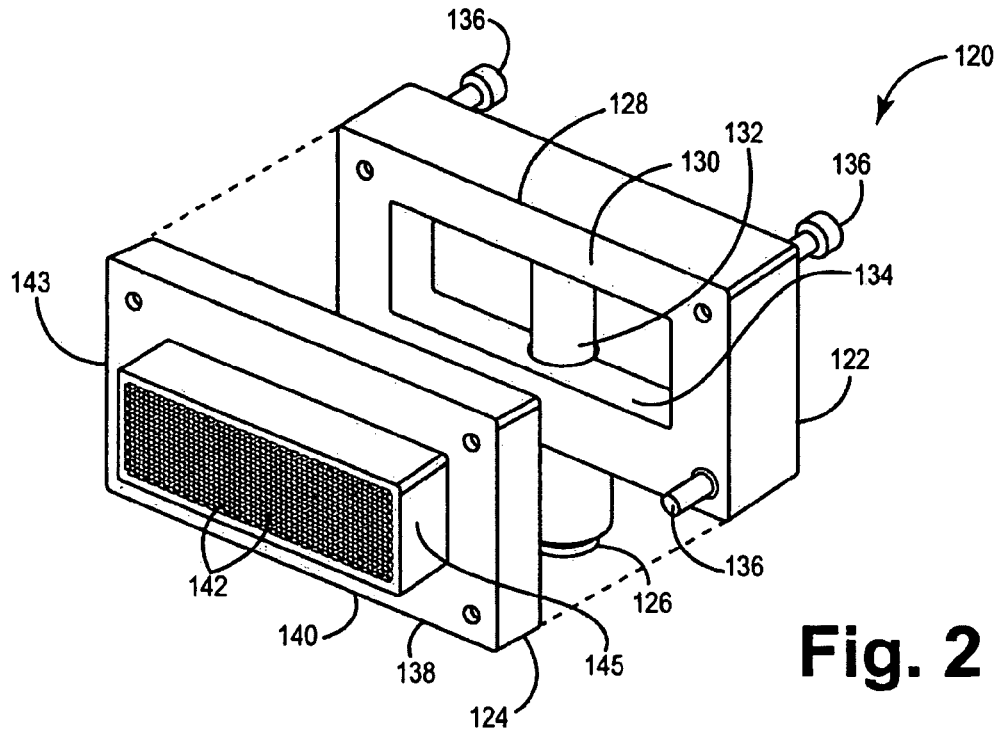
FIGS. 2 and 3 are front and rear exploded views, respectively, of a pick-up tool in accordance with a first embodiment of the present invention.
Figure 3:
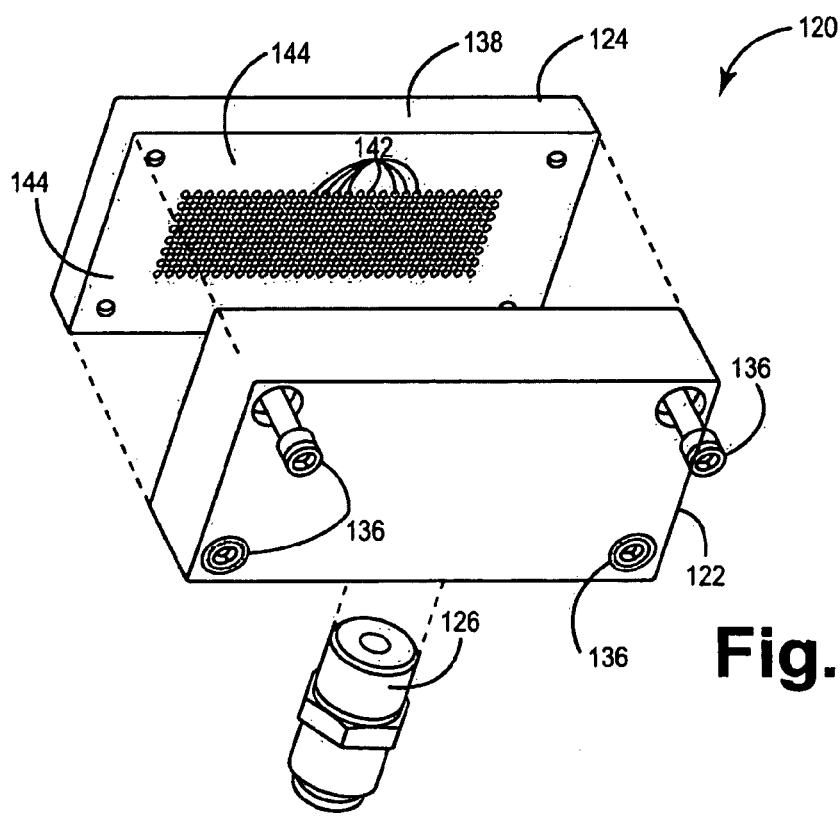

FIGS. 2 and 3 are front and rear isometric exploded views, respectively, of a vacuum actuated pick-up tool 120 in accordance with a first embodiment of the present invention. Tool 120 is machined from a suitable material (e.g., A2 annealed steel) and comprises a vacuum plenum or block 122, a pick-up cover or plate 124 configured to be coupled to block 122, and a fitting 126 fixedly coupled to block 122. Vacuum bock 122 includes a front surface 130 through which a pneumatic compartment 128 is provided. Pneumatic compartment 128 is coupled for fluid communication with fitting 126 by way of a channel 130 that extends through a wall 134 of block 122. Fitting 126 is fixedly coupled (e.g., welded) to vacuum block 122 at its first end and adapted at its second end to receive an airway (e.g., a flexible tube) that is coupled for fluid communication with a vacuum source (e.g., the depressurizing mechanism of a control assembly as described below in conjunction with FIG. 6).

Pick-up plate 124 comprises a base portion 138 including a front surface 143 (FIG. 2) and a rear surface 144 (FIG. 3). When pick-up plate 124 is fixedly coupled to vacuum block 122, rear surface 144 abuts front surface 130 of vacuum block 122, and pneumatic compartment 128 is substantially enclosed. As illustrated in FIGS. 2 and 3, this coupling may be accomplished by, for example, a plurality of fasteners 136 (e.g., stainless steel hex bolts). A plurality of openings 142 extend through base portion 138 from rear surface 144 to front surface 143. Openings 142 cooperate to define a grated area 140 along a region of front surface 143. As will be seen, grated area 140 is adapted to pneumatically secure a collector, such as cathode collector 100 (FIG. 1), to front surface 143 when the pressure within compartment 128 is sufficiently reduced. As shown in FIG. 2, front surface 143 may be provided with a raised region 145 encompassing grated area 140. Raised region 145 extends outwardly from base portion 138 so as to facilitate access of grated area 140 to a source of collectors and/or the chamber of a press die as described in greater detail below.

The coupling of pick-up plate 124 to vacuum block 122 places openings 142, and thus grated area 140, in fluid communication with compartment 128. As a result, when the pressure within compartment 128 is reduced, suction is generated along the surface of grated area 140. If pick-up plate 124 is positioned near a current collector (e.g., collector 100 shown in FIG. 1) as this suction is produced, the current collector will be pneumatically drawn to and secured to grated area 140. The current collector may then be positioned relative to a press die and pressed onto an active material disposed therein by movement of tool 120. The current collector may be released from pick-up plate 124 after pressing has been completed by simply de-activating the vacuum mechanism.

Figure 4:
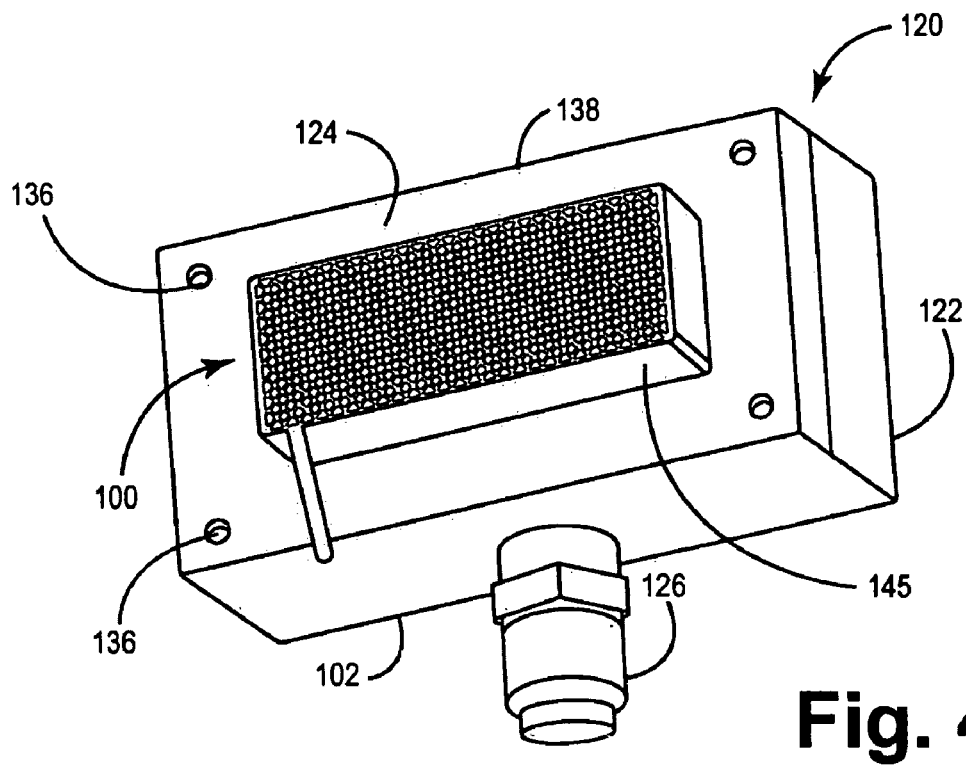
FIG. 4 is an isometric view of the pick-up tool shown in FIGS. 2 and 3 having the cathode collector shown in FIG. 1 pneumatically secured thereto.

Vacuum actuated pick-up tool 120 (FIGS. 2-4) is specifically adapted to interact with current collector 100 (FIG. 1) and other such collectors in at least two ways. The first of these ways may most easily be appreciated by referring to FIG. 4, which is an isometric view of pick-up tool 120 having cathode current collector 100 pneumatically secured thereto. In this view, it can be seen that raised region 145 of pick-up plate 124 has a substantially planar face having a length and width substantially equivalent to the length and width of current collector 100. In this way, collector 100 is entirely supported by region 145 when secured to grated area 140. This enables pick-up tool 120 to provide uniform pressure along the face of collector 100 during pressing onto the active material. Second, the planar face of region 145, in combination with the suction generated along grated area 140, corrects for collectors found in a misshapen condition. If, for example, collector 100 was found in a concave or convex condition, the suction generated at each of apertures 142 will cause collector 100 to flatten out along grated area 140 when collector 100 is secured to grated area 140. Collector 100 is then fixed in its proper, flattened state when pressed onto the active material in the manner described below in conjunction with FIG. 8.

Figure 5:
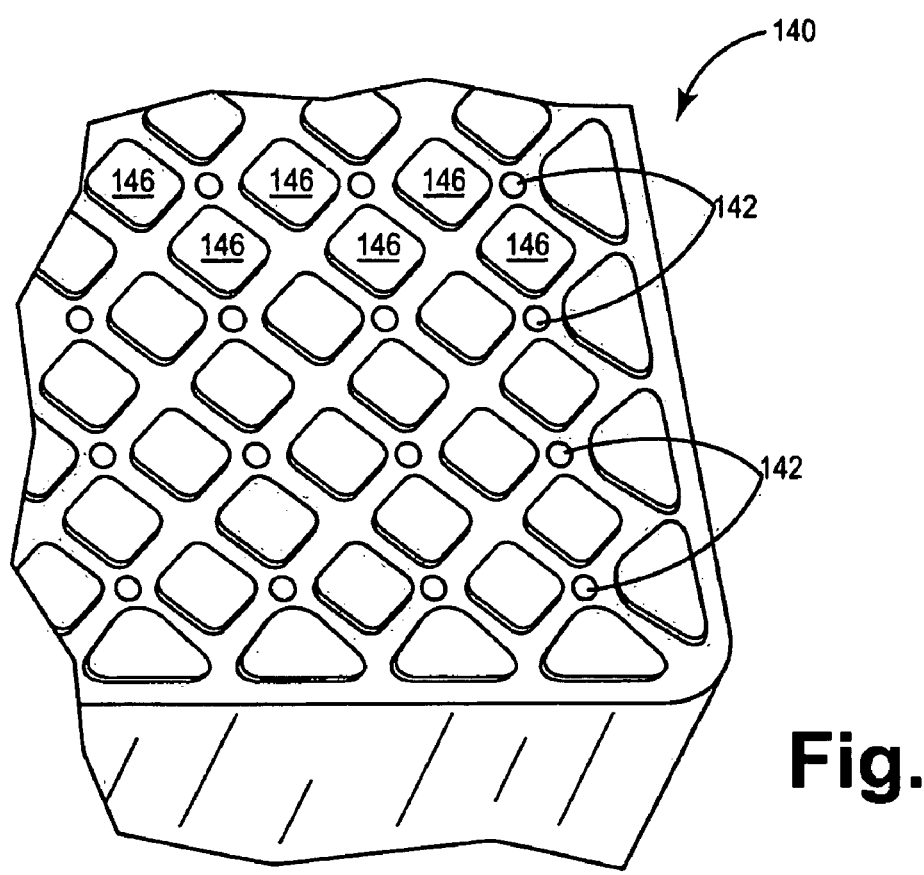
FIG. 5 is a detailed view of a portion of the grated area of the pick-up tool shown in FIGS. 2-4.

Referring to FIG. 5, grated area 140 of pick-up tool 120 is specifically adapted to transport and press collector 100 in two ways. First, openings 142 are positioned so as to align with veins 107 of collector 100 when collector 100 is pneumatically secured to grated area 140. By positioning of openings 142 in this way, tool 120 may more easily produce the suction necessary to pneumatically secure current collector 100 to grated area 140 despite apertures 108. Second, a plurality of protrusions 146 dispersed throughout grated area 140 is configured to be matingly received in apertures 108 when current collector 100 is pneumatically secured to grated area 140 to provide an alignment means. Thus, protrusions 146 function to ensure that collector 100 is properly aligned when secured to grated area 140, which, in turn, ensures that openings 142 align with veins 107 of collector 100 and that collector 100 is properly positioned within the die. The shape of each of protrusions 146 is preferably similar to that of the aperture by which the protrusion is to be received. Additionally, the height of protrusions 146 is preferably substantially equivalent to one half the thickness of collector 100. In this way, protrusions 146 may be configured to impede the passage of active material through apertures 108 of collector 100 during pressing. That is, protrusions 146 may prevent the extrusion of the active material by physically blocking or plugging apertures 108 during pressing thereby helping to preserve the symmetry and flatness of the active material layers.

In addition to, or in lieu of, protrusions 146, pick-up tool 120 may be provided with other alignment means, such as a peripheral lip extending about raised region 145 configured to circumferentially engage rim 102 of collector 100 when collector 100 is pneumatically secured to grated area 140.

Figure 6:
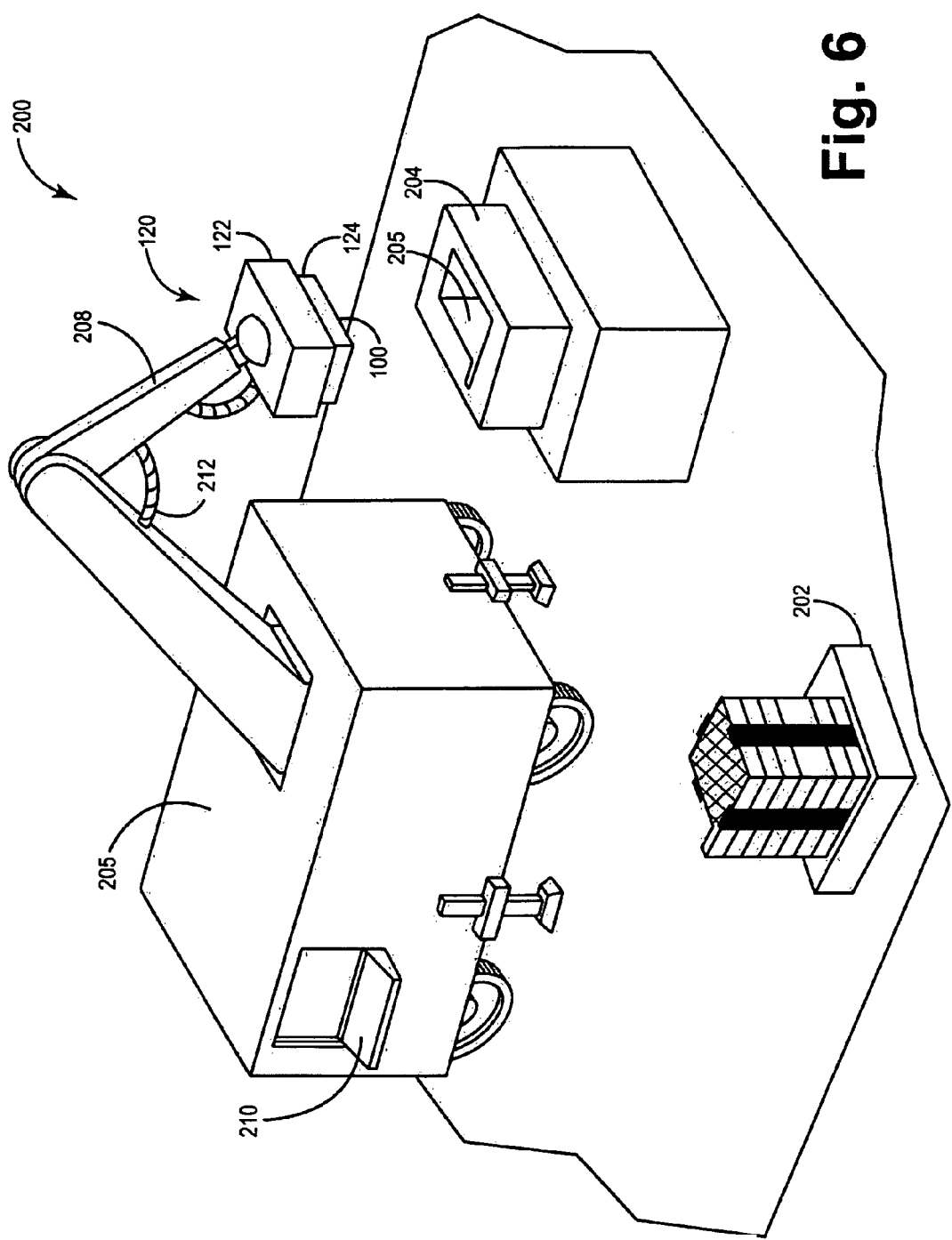
FIG. 6 is a isometric view of a system suitable for the production of electrochemical cells that comprises a supply of collectors, a press die, and a control assembly utilizing the pick-up tool shown in FIGS. 2-5.

FIG. 6 is a generalized isometric view of a system 200 configured to assemble electrochemical cells. In particular, system 200 is adapted to pick, place, and press current collectors similar to collector 100 (FIG. 1). System 200 comprises a supply of current collector (e.g., a magazine) 202, a press die 204 including a casting chamber 205, and a control assembly 206 including a robotic arm 208 and a user interface 210 for programming the movements of robotic arm 208. Vacuum actuated pick-up tool 120 is fixedly coupled to the distal end of arm 208, and fitting 126 (shown in FIGS. 2-4) is coupled to an airway (e.g., a flexible hose) 212 of control assembly 206. Airway 212 functions to fluidly couple tool 120, specifically pneumatic compartment 128 and grated area 140 of tool 120, to a vacuum source (e.g., a depressurizing mechanism contained within control assembly 206). In this way, control assembly 206 may cause a suction to be produced along grated area 140 to pneumatically secure collector 100 (and other such collectors) to pick-up tool 120 as shown in FIG. 6.

Figure 7:
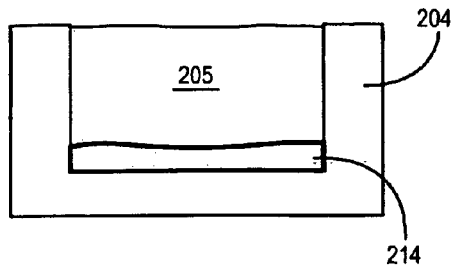
FIGS. 7-10 are cross-sectional views through the press die shown in FIG. 6 illustrating various steps that may be undertaken when producing an electrochemical cell.
Figure 8:
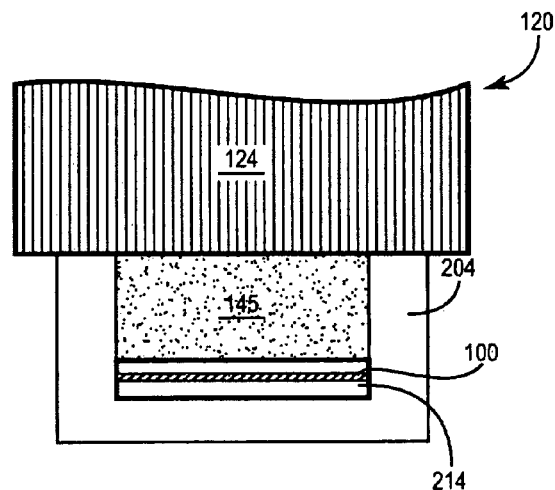
Figure 9:
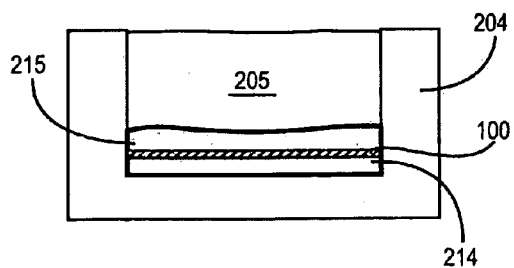
Figure 10:
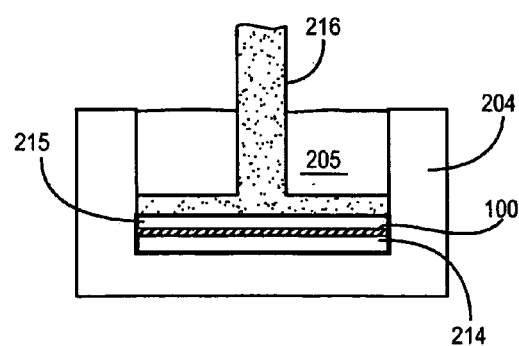

FIGS. 7-10 are cross-sectional views through press die 204 shown in FIG. 6 illustrating various steps that may be performed by system 200 to produce an electrochemical cell. To begin, a first quantity or layer of active material 214 (e.g., a cathode-type mix, such as silver vanadium oxide powder) is introduced into casting chamber 205 of press die 204 (FIG. 7). Next, pick-up tool 120 having a collector 100 pneumatically secured thereto (described above) introduces collector 100 into press die 204 and presses collector 100 onto active material 214 (FIG. 8). The dimensions of raised region 145 of pick-up plate 124 are such that access to press die 204 is facilitated. During pressing, pick-up tool 120 exerts a consistent downward force over the face of collector 100 to ensure that collector 100 is substantially parallel with the floor of chamber 205. The downward pressure exerted by tool 120 during this pre-press step may range from, for example, 50 to 1000 pounds per square inch. This compresses material 214 and causes it to adhere to the underside of collector 100. As state previously, protrusions 146 on grated area 140 prevent material 214 from extruding through apertures 108 of collector 100 during pressing. After pressing is complete, tool 120 may pneumatically release collector 100 and disengage from press die 204. Next, a second quantity or layer of active material (e.g., again a cathode-type mix, such as silver vanadium oxide powder) 215 may be introduced into chamber 205 (FIG. 9) and subsequently compacted by a flat press tool 216 to create two layers of active material of substantially equivalent thickness on each side of collector 100 (FIG. 10). The resulting collector/active material conglomeration may then be removed from press die 204 and inserted into a casing of an electrochemical cell.

It will be appreciated by one skilled in the art that the above-described cell assembly process may be automated. In addition, multiple pick-up tools may be coupled to arm 208 (FIG. 6) or another movement means (e.g., a hydraulic press assembly) to simultaneously construct multiple cells. If desired, pick-up plate 124 may be configured such that grated area 140 is contained on a modular cover that is freely interchangeable with other such covers having various grated areas each adapted to pneumatically secure a different type of current collector.

In view of the above, it should be appreciated that a method and apparatus for picking, placing, and pressing current collectors has been provided that overcomes the disadvantages described above (e.g., alignment errors) and that corrects for misshapen (e.g., warped) collectors. It should also be appreciated that, although the invention was discussed in conjunction with a specific current collector design (i.e., a grid of apertures defining a lattice of interwoven veins), the inventive apparatus may be utilized to pick, place, and press current collectors having other configurations (e.g., various other patterns of apertures and interconnected portions). Although the invention has been described with reference to a specific embodiment in the foregoing specification, it should be appreciated that various modifications and changes can be made without departing from the scope of the invention as set forth in the appended claims. Accordingly, the specification and figures should be regarded as illustrative rather than restrictive, and all such modifications are intended to be included within the scope of the present invention.

The invention claimed is:

1. A vacuum actuated pick-up tool for transporting a current collector, the pick-up tool comprising:

a housing having an external surface, an interior compartment, and a plurality openings extending from said external surface to said interior compartment, said interior compartment configured to be coupled in fluid communication with a vacuum source to pneumatically secure the current collector to said external surface, wherein the collector includes a plurality of apertures therethrough defining a plurality of interconnected portions, and wherein said plurality of openings is configured to substantially align with the portions when the collector is pneumatically secured to said external surface; and a plurality of protrusions extending from said external surface for contacting and spatially orienting the collector when pneumatically secured to said external surface, the plurality of protrusions each configured to be received by a different one of the plurality of apertures and interspersed with said plurality of openings.

2. A pick-up tool according to claim 1 wherein said housing comprises:

a pick-up plate including said external surface thereon; and a vacuum block fixedly coupled to said pick-up plate so as to define said interior compartment, said vacuum block including a channel therethrough configured to fluidly couple said interior compartment to the vacuum source.

3. A pick-up tool according to claim 1 wherein said plurality of openings cooperates to define a grated area on said external surface.

4. A pick-up tool according to claim 3 wherein said housing further includes a raised region on said external surface.

5. A pick-up tool according to claim 4 wherein said raised region supports the collector when secured to said external surface.

6. A pick-up tool according to claim 5 wherein the raised region has a substantially planar face having a width and a length, the width and length of said planar face is substantially equivalent to the width and length, respectively, of the collector.

7. A pick-up tool according to claim 1 wherein each of said plurality of protrusions has a height substantially equivalent to one half the thickness of the collector.

8. A vacuum actuated pick-up tool for positioning a current collector having a plurality of apertures therethrough, the pick-up tool comprising:

a vacuum block having a first surface, an interior compartment, and a channel to said interior compartment;

a fitting fixedly coupled to said vacuum block and configured to fluidly couple said channel to said interior compartment to enable selective reduction of pressure therein; and a pick-up plate for substantially enclosing said interior compartment, said pick-up plate comprising:

a second surface having a grated area thereon for fluidly communication with said interior compartment via a plurality of openings, said grated area configured to pneumatically secure the collector when the pressure within said interior compartment is reduced; and a plurality of protrusions each configured to be received by a different one of the plurality of apertures, wherein the plurality of apertures through the collector define a plurality of interconnected portions, and wherein said plurality of openings is interspersed with said plurality of protrusions such that each of said plurality of openings substantially aligns with one of said portions to secure the collector.

9. A pick-up tool according to claim 8 wherein said plurality of protrusions is configured to impede the passage of an active material through said plurality of apertures.

10. A pick-up tool according to claim 8 wherein each of said plurality of protrusions has height substantially equivalent to one half the thickness of the collector.

11. A pick-up tool according to claim 8 wherein said second surface includes a raised portion having said grated area thereon.

12. A pick-up tool according to claim 11 wherein said raised portion is configured to provide access to the casting chamber of a press die.

13. A pick-up tool according to claim 8 wherein said pick-up plate is removably coupled to said vacuum block.

* * * * *